April 2, 1963  C. F. CARLSON  3,083,684
APPARATUS FOR PATTERN REPRODUCTION
Filed Sept. 29, 1955

INVENTOR.
CHESTER F. CARLSON
BY
ATTORNEY

United States Patent Office 3,083,684
Patented Apr. 2, 1963

3,083,684
APPARATUS FOR PATTERN REPRODUCTION
Chester F. Carlson, Pittsford, N.Y., assignor, by mesne assignments, to Xerox Corporation, a corporation of New York
Filed Sept. 29, 1955, Ser. No. 537,452
2 Claims. (Cl. 118—246)

This invention relates to the field of xerography and, particularly, to improved apparatus for tackifying xerographic powder images in the preparation of master sheets for use in spirit duplicating.

In co-pending application S.N. 479,454 filed January 3, 1955, in the names of Robert W. Gundlach, George R. Mott and Edward R. Sabel, there is disclosed an improved method of and apparatus for affixing a predetermined dye pattern to the master sheet of a spirit duplicating set. Although the method and apparatus of the application are particularly well suited to high production installations for the preparation of spirit duplicating masters and are in extensive commercial use for such purpose, from the standpoint of initial cost and maintenance problems they are not particularly well adapted to installations in which a relatively limited number of spirit duplicating master sheets are to be prepared per day. In the latter type of installation, it is preferred to employ an apparatus that is effectively in stand-by condition at all times and can be put in operation to produce spirit duplicating masters immediately, as occasion arises. Also, in such an installation, it is essential that the equipment be such that the utilization of liquid solvent material be held to a negligible minimum during the periods that the apparatus is in stand-by condition.

To fill these requirements the present invention provides a simplified and low cost vapor tackifier wherein a xerographic powder image formed between the master and carbon sheets of a spirit duplicating set may be tackified by placing the duplicating set upon a rigid porous surface impregnated with a volatile solvent for the powder particles of the xerographic image and holding it in contact with the surface by means of a flexible plastic sheet that is superposed on the duplicating set. By this means, solvent vapor is efficiently transferred from the porous surface to the master sheet of the duplicating set, and into direct contact with the powder particles of the xerographic powder image. When thus processed, the powder particles are tackified and are caused to adhere to the master and carbon sheets by the application of a pressure roller applied to the upper surface of the plastic sheet whereby the tackified powder particles are forced into the interstices of the master and carbon sheets and are bonded thereto. When tackification and bonding is completed, the master set is removed from the porous surface and permitted to air-dry for a few seconds to remove excess solvent and may then be separated in conventional manner. The flexible plastic sheet is then replaced over the porous surface to prevent the evaporation of liquid solvent during the period that the apparatus is not in use.

In the process of liquid or spirit duplication, currently in general use for the production of copies of printed material, the copy to be reproduced is typed or written on the master sheet of a spirit duplicating sheet which includes a carbon sheet comprising a layer of dye-containing material mounted on a relatively smooth backing sheet so that the dye-containing material may readily be stripped therefrom. The dye-containing layer of the carbon sheet is arranged in juxtaposition to the master sheet, and the pressure of the type or writing instrument causes a quantity of dye from the carbon sheet to be deposited on the back of the master sheet in a pattern corresponding to that appearing on the front of the master sheet. When the master is thus prepared, it is placed on the rotating drum of a spirit duplicating machine. Copy paper is then fed into the machine and is moistened slightly, usually with an alcohol base dye solvent, as it comes in contact with either a roller or a wick. Relatively little of the solvent is applied so that it evaporates quickly, but it is sufficient to pick up a thin layer of dye from the master and this dye remains on the copy paper in the form of the pattern deposited on the master sheet.

For the reproduction of typewritten copy, this process is quite adequate and is widely used, although the typist must exercise somewhat more than usual care in centering and laying out the work. A limitation of the process is that a constant typing pressure must be maintained in order to deposit a dye pattern of uniform thickness on the surface of the master sheet. In the event that the dye pattern is not of uniform thickness throughout, the thinner portions of dye are expended more quickly than the remainder of the dye pattern, with the result that the number of complete copies that can be made is limited by the thickness of the dye pattern in its thinnest portion. A further limitation is that the correction of typographical errors must be effected directly on the master sheet and requires substantially more time and effort than in conventional typing practice, and usually results in noticeable defects in the finished copy.

When the process is applied to the reproduction of written copy, line work, or art work, it becomes particularly cumbersome and unwieldy. In such cases, it is currently required that the desired copy be formed directly on the face of the master sheet in the exact form in which it is to be reproduced and that the writing or drawing pressure be maintained constant throughout in order to deposit a dye pattern of uniform thickness on the reverse side of the master sheet in exact correspondence with the line copy pattern formed on the front. Such practice obviously requires the services of a skilled artist or draftsman and, at best, is extremely expensive and time-consuming. Furthermore, in its present form, the spirit duplicating process provides no method to make reproduction of existing copy such as prints, drawings, letterheads, or other forms of line copy, because there is no convenient method for forming a dye pattern on the master sheet that corresponds to the line copy pattern that is intended to be reproduced.

In order to overcome the above described limitations in the spirit duplicating process, the above mentioned co-pending application discloses an improved method and apparatus for the preparation of master sheets for use in the spirit duplicating process. In this method, the copy to be reproduced is first prepared in its final form on any convenient type of paper or support material and an electrostatic image of this copy is formed by the process of xerography on the photoconductive surface of a xerographic plate. An electroscopic powder, comprising a mixture of minute particles of resinous material and coloring matter, is then cascaded over this image in well-known manner so that the powder particles adhere to the electrostatic latent image and form a xerographic powder image of the copy to be reproduced. This pattern is then transferred electrostatically to the surface of the dye layer of the carbon sheet of a spirit duplicating set and is held thereon by electrostatic attraction. The master sheet of the spirit duplicating set is then superposed on the carbon sheet and the entire duplicating set is fed into a vapor chamber that contains an atmosphere of a liquid that is a solvent for the resinuous constituent of the powder particles. The resinuous particles absorb these vapors and are thereby tackified, i.e., reduced in viscosity and fused together in a mass that is internally cohesive and has a surface that is adhesive to many other materials including both the carbon and master sheets of conventional spirit duplicating sets. The xerographic powder image is progressively tackified as it passes through the vapor chamber, and, when it reaches the proper degree of tackification, the duplicating set is passed between a set of pressure rolls. During the pressure step of the process, both the master and carbon sheets are pressed firmly against opposite sides of the now viscous powder image so that a portion of the dye layer of the carbon sheet, corresponding to the pattern of copy to be reproduced, is caused to adhere to the master sheet and is firmly bonded thereto as the powder solvent evaporates and the pattern hardens. The carbon and master sheets are then separated and the adherent portion of the dye layer is literally pulled from the surface of the carbon sheet and remains affixed to the master sheet. Thereafter, the master sheet is used in conventional manner in the spirit duplicating process.

The principal object of the present invention is to provide an improved and simplified apparatus for tackifying a xerographic powder image formed between the master and carbon sheets of a spirit duplicating set and for bonding a dye pattern corresponding to the xerographic powder image to the master sheet. A further object of the invention is to provide an improved apparatus for bonding predetermined portions of the carbon layer of a spirit duplicating set to the master sheet thereof. A further object is to provide an improved apparatus for tackifying a xerographic powder image arranged between the master and carbon sheets of a spirit duplicating set. A further object of the invention is to provide improved apparatus for the rapid, efficient, and economical production of master sheets for use in spirit duplicating processes. A further object is to provide an improved apparatus for the preparation of spirit duplicating master sheets that may be placed in stand-by condition conveniently and remain therein with a minimum expenditure of liquid solvent material.

Briefly, these and other objects of the invention are attained by means of a vapor tackifier and bonding apparatus in which the spirit duplicating master set is brought against a rigid porous surface impregnated with a volatile solvent so that the solvent vapor is efficiently transferred to the set. In one embodiment of the invention, the apparatus includes a rigid porous plate mounted in a liquid-tight tray wherein the porous plate is spaced from the bottom of the tray by a perforate or liquid permeable spacing means, and liquid solvent for the xerographic image powder particles is caused to flow into the space between the bottom of the tray and the underside of the porous plate whereby the porous plate is impregnated with liquid solvent and is thereby conditioned to transfer solvent vapor to any object laid on the upper side thereof. In addition, the invention includes a flexible sheet of a material impervious and inert to the liquid solvent, that is superposed on the porous plate when the apparatus is in stand-by condition, to prevent the evaporation of the liquid solvent, and is superposed on a spirit duplicating set laid on the porous plate when the apparatus is in operative condition to maintain the duplicating set in intimate contact with the porous plate. In an alternate form of the invention, a rigid porous cylinder is rotatably mounted in a liquid-tight tank containing a volatile solvent whereby, as the cylinder rotates, its lowermost portion is continuously impregnated with solvent and is thereby conditioned to transfer solvent vapor to a master set rolled in contact with the uppermost portion thereof. In this form of the invention a flexible plastic sheet is also employed to maintain the master set in contact with the upper portion of the cylinder and to prevent solvent evaporation during stand-by conditions.

The term "tackified" and the several variant forms thereof used throughout this specification are employed to define the condition of the powder particles of the xerographic powder image when treated in a manner such that the individual particles soften and coalesce and in which state they become sticky and readily adhere to other surfaces. Although this condition necessarily requires a flowing together of the particles to effect a thorough fusion thereof, it is to be understood that the extent of such flowing is not sufficient to extend beyond the boundary of the pattern in which the particles are formed.

The apparatus of the invention is disclosed in the appended drawings, in which.

Figure 1:
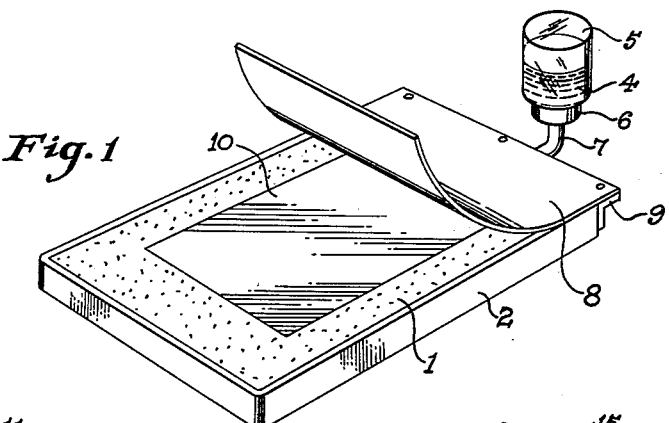
FIG. 1 is a schematic sectional view of a basic form of the invention.

Spirit duplicating sets of the type with which the invention may be employed are in wide commercial use and many types of these sets are available from various manufacturers. In general, each set comprises a master sheet and a carbon sheet attached along one edge by a suitable hinge. The set may also include a separating sheet to prevent smudging of the carbon sheet during handling but which is removed prior to the actual use of the set. The master sheet usually comprises a firmly coherent, smooth surfaced sheet of white paper that is readily receptive of impressions of typewriter type or conventional writing instruments. The carbon sheet comprises a firmly coherent backing sheet of relatively glossy surfaced paper on which a thin layer of dye material is uniformly spread. The dye material is usually suspended in a wax coating or similar form of binder to make it adhere to the carbon sheet, and the particles of such coating are only loosely coherent with each other whereby the pressure applied by a writing instrument or type face readily detaches the impressed portion from the remainder of the dye layer. Also, since the carbon backing sheet has a smoother surface than the master sheet, the dye layer in usual practice adheres more readily to the master sheet so that impressed portions are conveniently broken away from the carbon sheet when the components of the duplicating set are separated. Similarly, as in the above mentioned application and in the present instance, the simultaneous bonding of the powder particle pattern to the master sheet and to the dye layer results in a firm bond between these materials that is much stronger than the bond between the dye layer and the carbon backing sheet so that the bonded portions of the dye layer are cleanly stripped from the backing sheet when the carbon and master sheets are separated.

The xerographic formation and transfer of powder particle patterns of copy to be reproduced, as contemplated herein, is basically the same as that disclosed in Carlson Patent 2,297,691, issued October 6, 1942, wherein a plate comprising a coating of photoconductive insulating material on a conductive backing is given a uniform electric charge over its surface and is then exposed to the subject matter to be reproduced, usually by conventional projection techniques. This exposure discharges the plate areas in accordance with the light intensity which reaches them, thereby creating an electrostatic latent image on or in the plate coating. Development of the image is effected with a finely-divided material such as an electroscopic powder which is brought into contact with the coating and is held thereon electrostatically in a pattern corresponding to the electrostatic latent image.

The developing agent employed may be of any convenient type suitable to the requirements of the particular application, the type disclosed in Patent 2,618,551, issued November 18, 1952, to L. E. Walkup being illustrative of a form that may be used in most instances, although a wide variety of other resinous developing powders may be employed. As disclosed in this patent, the developer comprises a combination of coated glass bead carriers together with a mixture of powdered resin and carbon black particles. These components are mixed together to establish an electrostatic charge on the powder particles that is of opposite polarity to the charge comprising the xerographic latent image whereby, when the developer is cascaded over an exposed xerographic plate, the pigmented resin particles adhere to the charged surfaces of the plate and form a powder image or pattern of the latent image previously formed thereon. In the general application of xerography, the resin particles are subsequently bonded to the finished copy by the application of heat or by vapor fusion, and serve to secure the carbon black particles which provide the coloring matter in the finished copy. In the present application, the resin particles form the essential element of the powder mixture in acting as the bonding agent that unites the dye layer of the carbon sheet to the master sheet of the spirit duplicating set. The carbon black particles serve primarily to produce a readily visible image on the xerographic plate whereby an operator may check the completeness of the copy that is formed on the plate.

In the preparation of a spirit duplicating master sheet with the apparatus of the present invention, the spirit duplicating set is first processed, in part, in the manner disclosed in the above cited co-pending application, namely, a xerographic plate comprising a layer of photoconductive material mounted on a conductive backing, is impressed with a reverse reading electrostatic image of copy to be reproduced, in accordance with conventional xerographic processes. When the xerographic latent image is formed on the xerographic plate by suitable exposure, a powder particle developing agent is cascaded over the plate whereby the electrostatic latent image is transformed to a pattern of powder particles or xerographic powder image corresponding to the copy to be reproduced. Thereafter, the xerographic powder image is transferred electrostatically to the carbon layer of the carbon sheet of a spirit duplicating set to form a direct reading powder pattern on the carbon sheet whereby, in effect, the xerographic powder image is sandwiched between the carbon layer and the master sheet.

Figures 2, 3:
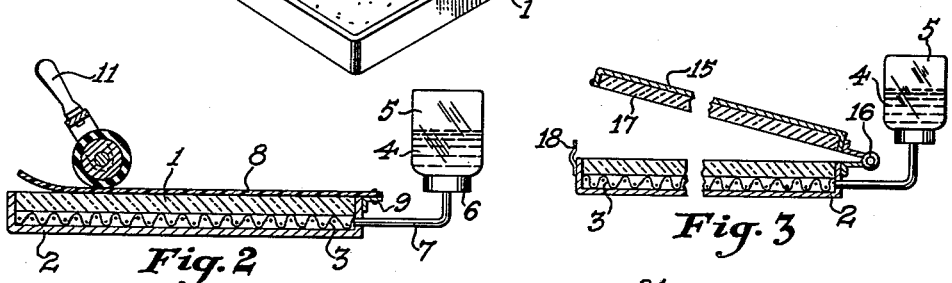
FIGS. 2, 3, 4 and 5 are schematic sectional views illustrating modified forms of the invention.

The duplicating set is then in condition to be processed with the apparatus of the invention which, in the embodiment shown in FIGS. 1 and 2, comprises a rectangular, rigid, porous plate 1 that is inserted in a rectangular, liquid-tight tray 2, and is spaced slightly from the bottom thereof by a perforate or liquid pervious spacing material 3. The porous plate 1 is preferably formed of unglazed porcelain or compressed and bonded asbestos and other fibrous compositions, but may also be formed of other rigid porous materials such as porous metal, plaster of Paris, porous glass, etc. In any case, the only requirements are that it be sufficiently rigid to withstand the application of a bonding pressure, as described below, and that it be of such porosity that a liquid solvent for xerographic image powder particles, placed in contact with the underside of the plate, be drawn therethrough by capillary action to the upper surface of the plate. The separating material 3 is preferably a relatively incompressible wire mesh, a corrugated or grooved metal plate, or sheet of plasterboard, any one of which will readily permit substantially unimpeded flow of liquid solvent throughout the area of the porous plate. A non-rigid material such as burlap, canvas, paper or cloth may also be used as the means for distributing liquid solvent but in these cases it is preferred to use rigid spacers to separate the pourous plate from the bottom of the tray in order to prevent rocking of the plate when pressure is applied.

The elements thus far disclosed may be formed into a unitary structure by bending the upper edges of the ends of the tray over the top of the porous plate, or by attaching angle pieces to the ends of the tray and causing the turned-over portions of the angles to bear on the top of the plate. The liquid solvent 4 for tackifying the xerographic powder image is contained in a reservoir or fountain bottle 5 that is supported in a suitable stand 6 and is connected by a piece of tubing 7 to conduct liquid from the reservoir through an opening in tray 2 and into the space formed between the bottom of the tray and the underside of porous plate 1. By this arrangement, the underside of plate 1 is maintained in constant contact with the liquid solvent and a constant supply of solvent is brought to the upper surface of the plate by capillary action. The particular solvent employed may be of any type that will tackify the powder particles of the xerographic powder image without adversely affecting the carbon layer of the carbon sheet or the wax binder thereof. Solvents such as trichlorethylene, butyl acetate, butanol, Cellosoive, or various alcohols, or mixtures of these solvents may be employed, depending upon which is best suited for use with the particular type of duplicating set employed.

In order to prevent evaporation of the solvent from the upper surface of the porous plate, a flexible sheet 8 of tetrafluoroethylene resin, such as Teflon, or other plastic not affected by the solvent is placed on top of the upper surface of the porous plate and, if desired, may be secured at one end to the tray, for example, by means of an angle bracket 9. The flexible sheet is substantially coterminous with the porous plate and thus prevents access of air to the surface of the plate when the apparatus is in stand-by condition. By this arrangement, it is possible to use inflammable liquid solvents as the tackifying agent, if desired, as no explosive vapor space is present in the apparatus.

When the apparatus is used for the preparation of a Ditto master sheet, flexible sheet 8 is folded back and a duplicating set 10, prepared as above, is placed on porous plate 1 with the master sheet of the duplicating set in contact with the porous plate. Flexible sheet 8 is then superposed over the duplicating set to maintain the set in intimate contact with the plate over its entire surface. In general, the solvent vapor permeates the master sheet and tackifies the xerographic powder image in a period of from ten to fifteen seconds. During this tackification period, pressure may be applied to the upper surface of the flexible sheet by means of a suitable roller 11 that may be passed several times over the surface of the sheet to force the tackified powder particles into the interstices of the opposed surfaces of the master sheet and carbon layer of the carbon sheet.

When tackification and bonding are complete, the duplicating set is removed from the apparatus and is permitted to air-dry for a few seconds to allow any excess solvent to evaporate and to permit the tackified xerographic powder image to harden. When the master sheet and the dye layer of the carbon sheet are firmly united by the coalesced powder particles of the powder image, the sheets are separated either by stripping, in the usual manner, or by sliding the carbon sheet over a rod or other rounded surface whereby the bonded dye particles are cleanly broken from the dye layer remaining on the carbon sheet. The master sheet, to which a dye pattern conforming to the image to be reproduced is firmly affixed, may then be used for producing copies in a duplicating machine in conventional manner.

In a modified form of the invention shown in FIG. 3, the tackifying and bonding apparatus includes a vapor-tight tray 2, in which is mounted a rigid porous plate 1 that is separated therefrom by a wire mesh spacer 3, and in which liquid solvent 4 is supplied from a reservoir 5, all in the manner described above. In addition, this form of the invention includes a second tray member 15 that is coterminous with tray member 2 and is connected thereto by a suitable hinge 16, and is provided with a second porous plate member 17 seated therein. In this arrangement, the second porous plate is used, instead of a flexible sheet and roller, to apply pressure to a spirit duplicating set that is placed on top of the lower porous plate member, and also serves, during stand-by conditions, to prevent evaporation of the solvent from the surface of the lower porous plate member. A suitable latching device 18 may be employed during the pressure applying and stand-by modes of operation to maintain the opposed surfaces of the porous plates clamped together.

It is to be noted that the arrangement shown in FIG. 3 does not require the use of a separate reservoir in order to feed liquid solvent to the second porous plate member. During stand-by conditions, the porous plate members are in surface contact so that liquid solvent or solvent vapor from the upper surface of the lower plate member is drawn into the upper plate member. By this construction, an additional supply of liquid solvent or solvent vapor is available to tackify the xerographic powder image more rapidly when the plates are subsequently separated and brought together again to apply pressure to a spirit duplicating set placed on the lower plate member. If desired, the exposed surface of the upper porous plate member may be overlaid with a resilient layer of porous paper or similar material to facilitate the transfer of liquid solvent from the lower plate to the upper plate during stand-by conditions.

When tackifying and bonding is complete, the spirit duplicating set is removed and air-dried for a few seconds, as described above, to evaporate excess solvent and to permit the powder image to harden and bond to the opposed surfaces of the carbon and master sheets. When this is done, the sheets are then separated in conventional manner, as above, whereby the master sheet is effective to pull a dye layer pattern, corresponding to the xerographic powder image, from the surface of the carbon sheet dye layer.

Figure 4:
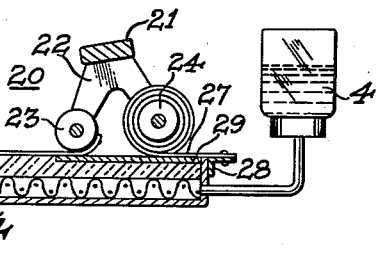

In the form of the invention shown in FIG. 4 a rigid porous plate 1 is mounted in a tray 2 and maintained saturated with liquid solvent 4, in the manner described above, and the top surface of the plate is kept covered at all times with either of two impermeable sheets of Teflon, polyethylene or other solvent impermeable, flexible material. This is accomplished by means of a roller assembly 20 including a handle 21 having two side frame members 22 secured thereto, said frame members serving to support a pair of rollers 23 and 24 for rotation about parallel axes. A sheet of Teflon 25, of a dimension sufficient to cover the entire upper surface of the porous plate 1, is secured at one of its ends to a crossbar 26 on the tray member and at its other end to the surface of roller 23. A second, similarly dimensioned sheet of Teflon 27 is connected at one end to a crossbar 28 of the tray member and at its other end to roller 24. Preferably, the porous plate assembly is provided with an inset metallic plate 29 or comparable impervious member on which roller assembly 20 may rest when the apparatus is in stand-by condition.

When a duplicating set is to be tackified and bonded, roller assembly 20 is moved slightly to the left until roller 24 is resting on porous plate 1. In this position of the parts, the duplicating set is inserted beneath roller 24 with the master sheet in contact with porous plate 1. Continued movement of roller assembly 20 to the left causes the first Teflon sheet 25 to be rolled onto its roller 23 and to expose the surface of the porous plate immediately preceding the duplicating set, and causes the second Teflon sheet 27 to be unrolled over the surface of the duplicating set to press the set firmly in contact with the porous plate. After a suitable tackifying period, roller assembly 20 is moved to the right so that roller 24 again traverses the entire area of the spirit duplicating set and forces the tackified xerographic powder image into the interstices of the opposed surfaces of the master and carbon sheets. As the trailing edge of the duplicating set first appears in the space between the rollers, it is lifted upwardly and caused to ride over the surface of roller 23 as the movement of the roller assembly is continued. When the duplicating set is removed from the apparatus, it may be air-dried for a few seconds, as above, and then separated to produce a master sheet having a dye image corresponding to the xerographic powder image firmly bonded thereto.

Figure 5:
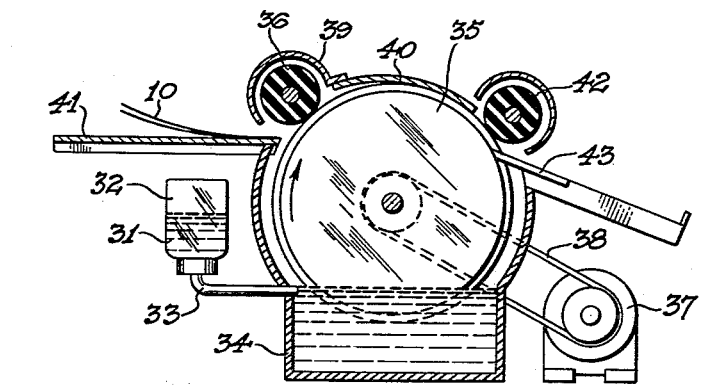

In the form of the invention shown in FIG. 5, the liquid solvent 31 for the xerographic image powder particles is fed from a liquid reservoir 32 through a supply tube 33 into a fluid-tight tank 34. Mounted for rotation on the side walls of tank 34 is a rigid cylinder 35 preferably formed of unglazed porcelain or having an unglazed porcelain surface. The cylinder mounting means is so arranged that the lower portion of cylinder 35 dips into the liquid solvent contained in the bottom of tank 34. Preferably, the side walls of tank 34 are curved to conform closely to the contour of the cylinder and thereby reduce the vapor space available for the collection of liquid solvent vapors to an absolute minimum in order to minimize the possibility of explosion in the event an inflammable solvent is employed.

A pressure roll 36 is mounted for rotation in side brackets (not shown) fixed on the side walls of the tank, and is resiliently urged into surface contact with cylinder 35. Suitable driving means, including a motor 37 and belt 38, are provided whereby pressure roll 36 and cylinder 35 are rotated in opposite directions and at equal peripheral speeds. A curved shield 39 extends across the width of the machine and serves to prevent manual contact with pressure roll 36. A resilient guide member 40, preferably formed of flexible plastic material conforming to the contour of cylinder 35, is mounted on an extension of shield 39 and serves to cover the entire exposed area of the cylinder, thereby preventing unnecessary evaporation of the liquid solvent and also preventing manual contact with the cylinder. A horizontal feed table 41 is mounted on the upper edge of the tank and serves to support spirit duplicating sets 10 prior to their insertion in the apparatus.

When a Ditto master sheet is to be made, a duplicating set prepared as described above is placed on feed table 41 with the master sheet in contact therewith and is pushed forwardly on the feed table until its leading edge is engaged between pressure roller 36 and cylinder 35. Thereafter, the duplicating set is advanced by the combined action of the pressure roller and cylinder and is passed beneath resilient guide 40, whereby the master sheet is maintained in intimate contact with the surface of the porous cylinder and serves to absorb sufficient solvent vapor to tackify the xerographic powder image. As the leading edge of the duplicating set reaches the end of guide member 40, it is engaged by a second pressure roll 42, which is also mounted in side brackets (not shown) formed on the upper wall of tank 34 and is driven at a peripheral speed equal to that of cylinder 35. As the duplicating set passes beneath pressure roll 42 it is urged against the surface of cylinder 35 with sufficient pressure to force the now tackified powder particles into the interstices of the opposed surfaces of the carbon and master sheets. Immediately thereafter, the leading edge of the duplicating set is lifted from the surface of cylinder 35 by peel-off fingers 43 that are mounted on the frame of tank 34 and have their free ends extended into peripheral grooves 44 formed on the ends of cylinder 35 so that they ride under the leading edge of the duplicating set and guide it onto a receiving tray 45 supported on the tank frame.

As with the preceding forms of the invention, the duplicating set is then permitted to air-dry to remove excess solvent vapor and is separated in conventional manner. It should be noted that pressure roll 42, in the form shown in FIG. 5, is not an essential element of the invention since the spirit duplicating set with the tackified image arranged between the sheets thereof will be forced forwardly onto receiving tray 45 by the action of cylinder 35 and may then be rolled by the application of a manual roller to effect the desired bonding.

In each of the forms of the invention described above it should be noted that the rigid porous plate or cylinder, because of its rigidity, holds the liquid solvent in close proximity to the master set without unduly wetting it, but allows solvent vapor to pass rapidly and efficiently into the master set. Thus, pressure can be applied without squeezing liquid into the master sheets because of the rigidity of the plate or drum. Furthermore, although unglazed porcelain is considered highly desirable for use as a plate or cylinder material, it should be noted that solvent vaporization can be further accelerated if the plate or cylinder is made of porous pressed metal powder, such as copper, aluminum, or other rapid heat conductor. With such a construction, the cooling effect of evaporation of solvent from the porous support surface is rapidly compensated for by heat conduction through the support body so that the surface temperature does not drop as evaporation of solvent into the master set takes place.

Although the apparatus of the invention is described with particular reference to its application to the field of spirit duplicating, it is apparent that it may readily be applied in other fields for the purpose of pattern transfer within the scope of the invention. For example, should it be desired that a direct reading pattern be formed on a master sheet, as for use in an offset duplicating process, the reverse reading powder image on the xerographic plate may be transferred directly to the master sheet instead of to the carbon sheet, as described above. When this is done, the apparatus functions in the manner described above, to tackify the powder pattern to a degree to permit it to be bonded to the opposed surfaces of the master and carbon sheets. Similarly, numerous other applications of the invention will be apparent to those skilled in similar or related arts whereby a desired pattern forming material that is difficult of conventional application or handling may be bonded to a supporting sheet or layer by means of a common bonding agent that can conveniently be formed into the desired pattern by xerographic processes. Therefore, it is intended that all matter contained in this specification be interpreted in an illustrative sense, and that the invention be limited only as defined in the appended claims.

What is claimed is:

1. An apparatus for tackifying a xerographic powder image formed between the master and carbon sheets of a spirit duplicating set and for bonding said image to the opposed surfaces of said sheets, said apparatus comprising a liquid-tight tank, a solvent vapor generating device including a cylinder mounted for rotation in said tank, said cylinder having a porous peripheral surface, means for impregnating said porous surface with a volatile solvent for xerographic image powder particles, a pressure roll engaging the surface of said cylinder, motive means for rotating said cylinder, means for guiding a spirit duplicating set between said pressure roll and said cylinder, and resilient means for maintaining a spirit duplicating set in contact with said cylinder during a predetermined portion of its rotational travel.

2. An apparatus for tackifying a xerographic powder image formed between the master and carbon sheets of a spirit duplicating set and for bonding said image to the opposed surfaces of said sheets, said apparatus comprising a liquid-tight tank, a solvent vapor generating device including a cylinder mounted for rotation in said tank, said cylinder having a porous peripheral surface, means for impregnating said porous surface with a volatile solvent for xerographic image powder particles, a pressure roll engaging the surface of said cylinder, motive means for rotating said cylinder, means for guiding a spirit duplicating set between said pressure roll and said cylinder, resilient means for maintaining a spirit duplicating set in contact with said cylinder during a predetermined portion of its rotational travel, said resilient means comprising a curved flexible sheet having its leading edge adjacent said pressure roll, and a second pressure roll engaging the surface of said cylinder adjacent the trailing edge of said resilient sheet.

References Cited in the file of this patent

UNITED STATES PATENTS

| Number | Name | Date |
|---|---|---|
| 365,213 | Wilkinson | June 21, 1887 |
| 556,265 | Hampsher | Mar. 10, 1896 |
| 622,389 | Ponsolle | Apr. 4, 1899 |
| 625,777 | Koch | May 30, 1899 |
| 638,899 | Wolever | Dec. 12, 1899 |
| 826,733 | Moore | July 24, 1906 |
| 872,392 | Von Auw | Dec. 3, 1907 |
| 1,241,322 | Woody | Sept. 25, 1917 |
| 1,913,022 | Dennis | June 6, 1933 |
| 1,979,811 | Reardon | Nov. 6, 1934 |
| 1,981,321 | Murphy | Nov. 20, 1934 |
| 2,142,318 | Langsner | Jan. 3, 1939 |
| 2,297,691 | Carlson | Oct. 6, 1942 |
| 2,534,422 | Ditty | Dec. 19, 1950 |
| 2,565,370 | Hodin | Aug. 21, 1951 |
| 2,624,652 | Carlson | Jan. 6, 1953 |
| 2,654,340 | Dudis et al. | Oct. 6, 1953 |
| 2,688,307 | Nichols et al. | Sept. 7, 1954 |
| 2,702,254 | Dowd | Feb. 15, 1955 |
| 2,776,907 | Carlson | Jan. 8, 1957 |